Dec. 29, 1925.                                                     1,568,006
G. D. TALLEY
AUTOMATIC PEDAL LATCH
Filed June 4, 1925
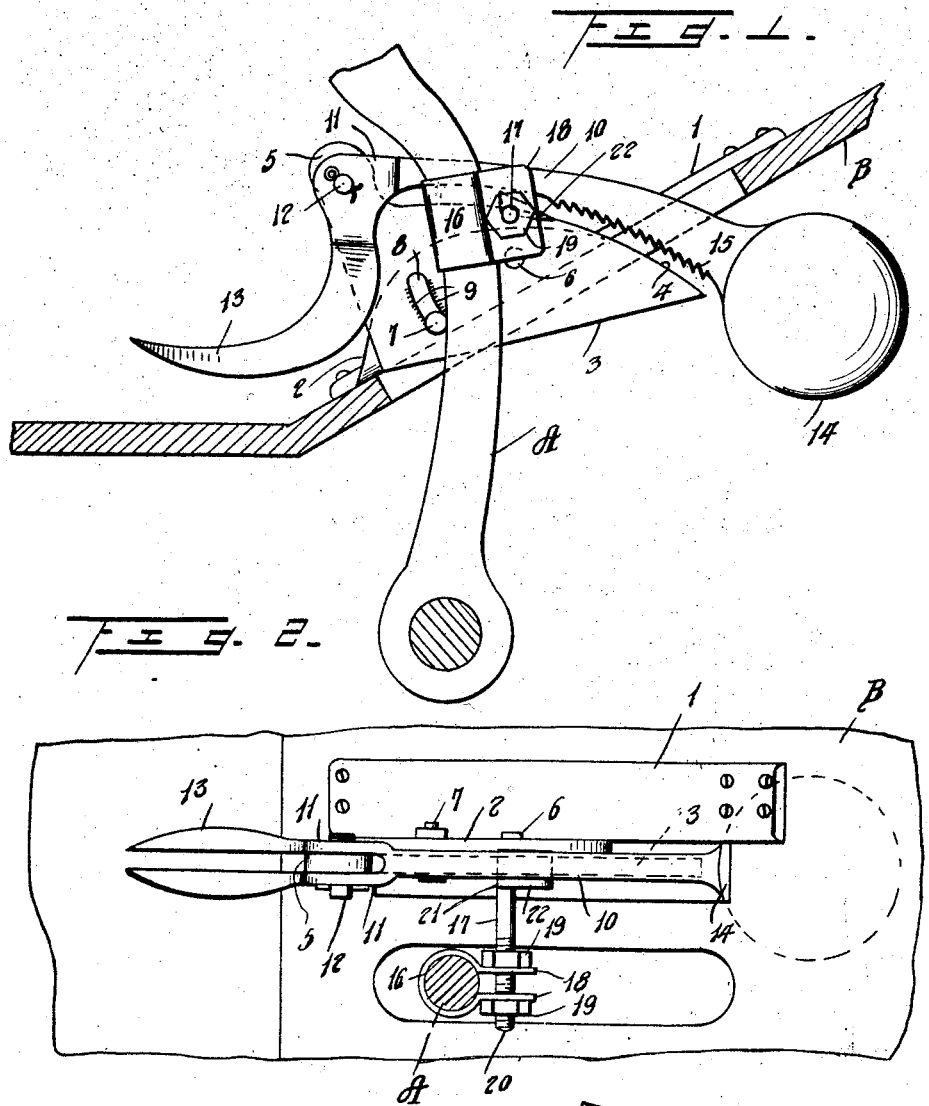
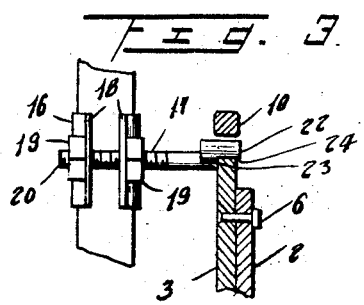
Inventor
G. D. Talley.

Patented Dec. 29, 1925.

1,568,006

UNITED STATES PATENT OFFICE.

GEORGE D. TALLEY, OF MEXICO, MISSOURI.

AUTOMATIC PEDAL LATCH.

Application filed June 4, 1925. Serial No. 34,914.

*To all whom it may concern:*

Be it known that I, GEORGE D. TALLEY, a citizen of the United States, residing at Mexico, in the county of Audrain and State of Missouri, have invented certain new and useful Improvements in Automatic Pedal Latches; and I do hereby declare the following to be a full, clear, and exact description of the invention, such as will enable others skilled in the art to which it appertains to make and use the same.

The invention relates to means for latching and holding a pedal used in controlling the operation of automobiles and has particular reference to that type of automobile employing a pedal for controlling the clutch and the high and low speed transmission and has for its object the provision of means by which the pedal may be latched either in neutral or low position and expeditiously released therefrom when it is desired to go into high.

Heretofore in operating automobiles of the type referred to it has been necessary when it is desired to run in low gear to hold the pedal depressed with one of the feet of the operator and no provision has been made by which the pedal may be held in a neutral or ungeared position while operating a starter or cranking the engine to start the motor. This invention provides means by which this may be accomplished, and thus add to the efficiency of the operation of an automobile of the type mentioned.

The device will be described in detail hereinafter and will be found illustrated in the accompanying drawings, in which Figure 1 is a side view of a clutch pedal showing the latching attachment associated therewith, Figure 2 is a section on a plane indicated by the line 2—2 of Figure 1, Figure 3 a detail view of a fragment of the pedal arm showing the latching pin in position thereon, and Figure 4, a view in perspective of the latch pin.

In the drawings similar reference characters will be used to designate corresponding parts in the several views.

The pedal A shown in the drawings is the pedal used to control the clutch and the transmission of an automobile of the type having pedal control for these parts, said pedal operating through a slot in the floor B of the automobile in the usual manner.

The latch attachment comprises a support having a base plate 1 that is secured to the floor B at one side of the pedal and in close proximity thereto, and besides supporting the latch attachment serves to reinforce the floor at this point which is one of the weakest points of the floor of the type of car hereinbefore referred to. 2 indicates an upright flange on one edge of the base plate 1 and is designed to support the triangular-shaped plate 3 having its upper edge curved as shown at 4 and provided with an extension 5 at its wider end. Plate 3 is supported on the upright extension 2 by means of a pin 6 and a pin or bolt 7 that engages the slot 8 in the plate 3, the surface of the plate adjacent to the walls of the slot being corrugated or roughened as shown at 9, while the inner face of the head of the bolt 7 should also be roughened or corrugated to efficiently hold the plate in adjusted positions. The necessity for adjusting the plate 3 which supports the latching member to be hereinafter described is that the device may be arranged to operate satisfactorily under all conditions of variation in the angle of the floor on which the device is mounted and the arc of the movement of the pedal.

10 indicates a lever that is bifurcated as shown to form two prongs 11 and straddle the extension 5 to which the prongs are pivoted by means of a pin 12, the ends of the prongs 11 being curved downwardly and substantially horizontally to form a heel rest 13 for operation of the lever. The other extremity of the lever is provided with a weight 14 and normally tends to hold that end of the lever in a lowered position.

The under face of lever 10 is provided with ratchet teeth 15. Secured to the pedal A by means of a band 16, is a bolt or pin 17 secured to flanges 18 on said band by means of nuts 19 engaging a threaded end 20 of the pin or bolt it being understood that this construction admits of adjusting the pin or bolt lengthwise of the pedal arm and also that its end to be hereinafter described may be properly adjusted to engage the plate 3 and the lever 10. The head of the pin 17 is formed substantially wedge-shaped as shown having a vertical face 21, an inclined top surface 22, and the under side is formed with a shoulder 23 providing a bearing surface 24 that engages on the curved upper edge 4 of the plate 3. The edge formed by the vertical face 21 and the top surface 22 is engaged by the lower face of the lever 10 at all times and serves to hold the lever 10 in its proper relationship with the curved edge 4 of the plate 3, and when the pedal is moved rearwardly from the forwardmost position the head of the pin 17 will be engaged by the ratchet teeth 15 and will hold the pedal in its rear position. When it is desired to release the pedal to resume its forwardmost position, the operator places his heel on the rest 13 of the lever 10 and by pressing downwardly lifts the lever 10 to release the ratchet teeth from engagement with the pin head when the pedal will immediately resume its forwardmost position, or the operator may ease it to the forwardmost position with the toe of the same foot used for actuating the lever.

What is claimed is:—

1. In combination with a pedal for controlling the clutch of an automobile transmission system, an angular support suitably secured adjacent to the pedal, a plate adjustably secured to said support, a lever fulcrumed on said plate, ratchet teeth on said lever, and means associated with the pedal to engage said teeth to hold the pedal in adjusted positions.

2. In combination with a pedal for controlling the clutch of an automobile transmission system, an angular support suitably secured adjacent to the pedal, a plate adjustably secured to said support, a bell crank lever fulcrumed on said plate, one of the arms of said lever being weighted, ratchet teeth on said weighted arm, the other arm having a lateral treadle extension, and means associated with the pedal to engage said teeth to hold the pedal in adjusted positions.

3. In combination with a pedal for controlling the clutch of an automobile transmission system, an angular support suitably secured adjacent to the pedal, a plate adjustably secured to said support and having its upper edge curved, a lever fulcrumed on said plate, ratchet teeth on said lever, a dog carried by said pedal and engaging the curved edge of the plate and adapted to engage said ratchet teeth to hold the pedal in adjusted positions.

In testimony whereof I affix my signature.

GEORGE D. TALLEY.